United States Patent [19]

Torkelson

[11] Patent Number: 5,060,471
[45] Date of Patent: Oct. 29, 1991

[54] JET ENGINE NOISE REDUCTION SYSTEM
[75] Inventor: Delbert W. Torkelson, Claremore, Okla.
[73] Assignee: 501 Nordam, Tulsa, Okla.
[21] Appl. No.: 474,346
[22] Filed: Feb. 2, 1990

Related U.S. Application Data

[63] Continuation-in-part of Ser. No. 432,367, Oct. 6, 1989.
[51] Int. Cl.⁵ ............................ F01N 1/24; F02K 1/04
[52] U.S. Cl. ........................................ 60/262; 60/271; 181/213; 415/119
[58] Field of Search ...................... 60/262, 226.1, 271; 181/213, 214, 220; 415/119

[56] References Cited

U.S. PATENT DOCUMENTS

| | | | |
|---|---|---|---|
| 3,262,264 | 7/1966 | Gardiner et al. | 239/265.19 |
| 3,750,402 | 8/1973 | Vdoviak et al. | 60/261 |
| 4,293,053 | 10/1981 | Shuttleworth et al. | 181/213 |
| 4,433,751 | 2/1984 | Bonneau | 181/224 |

OTHER PUBLICATIONS

C. L. Arctander, C. G. Hodge; R. B. Tate; "Development of Noise-Reduction Concepts for 727 & 737 Airplanes"; *Journal Acoustic Society America;* vol. 58, No. 1, Jul. 1975.

*Primary Examiner*—Louis J. Casaregola
*Assistant Examiner*—Laleh Jalali
*Attorney, Agent, or Firm*—Head & Johnson

[57] ABSTRACT

A noise reduction system for a jet engine including a tubular exhaust shroud affixed to the engine through which engine exhaust gases pass, porous acoustical lining affixed to a substantial portion of the internal circumferential surface of the shroud, a chamber in contact with the acoustical lining outer surface and a controllable source of air pressure affixed to the chamber to control the passage of air through the acoustical lining to thereby vary the acoustical absorption properties of the lining.

17 Claims, 6 Drawing Sheets

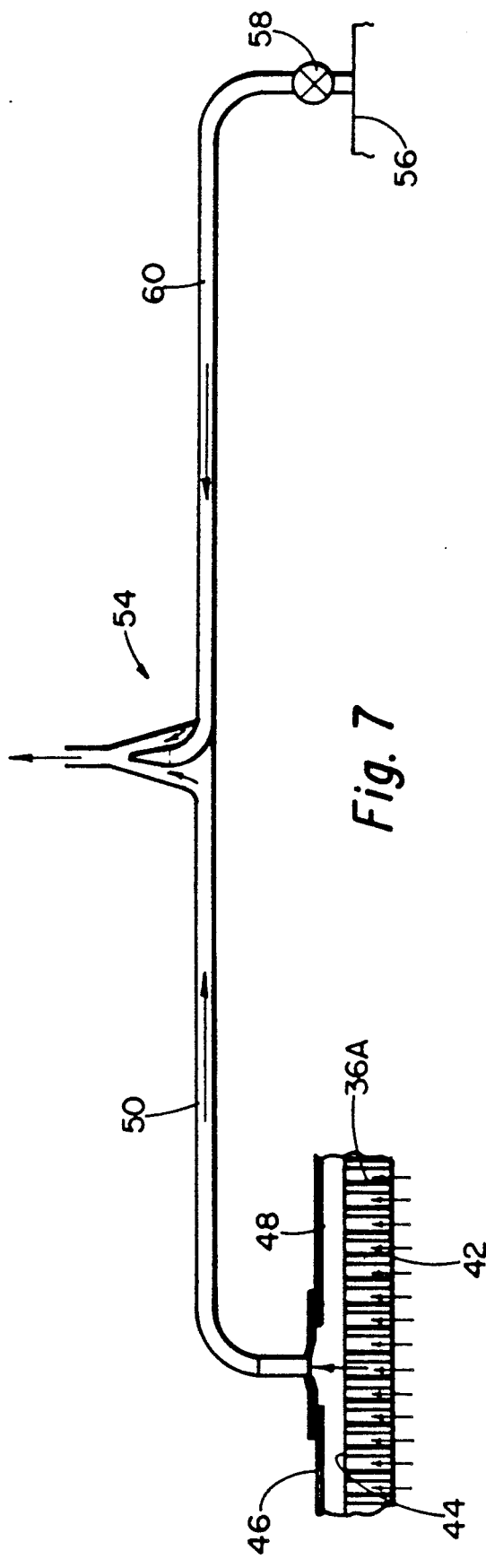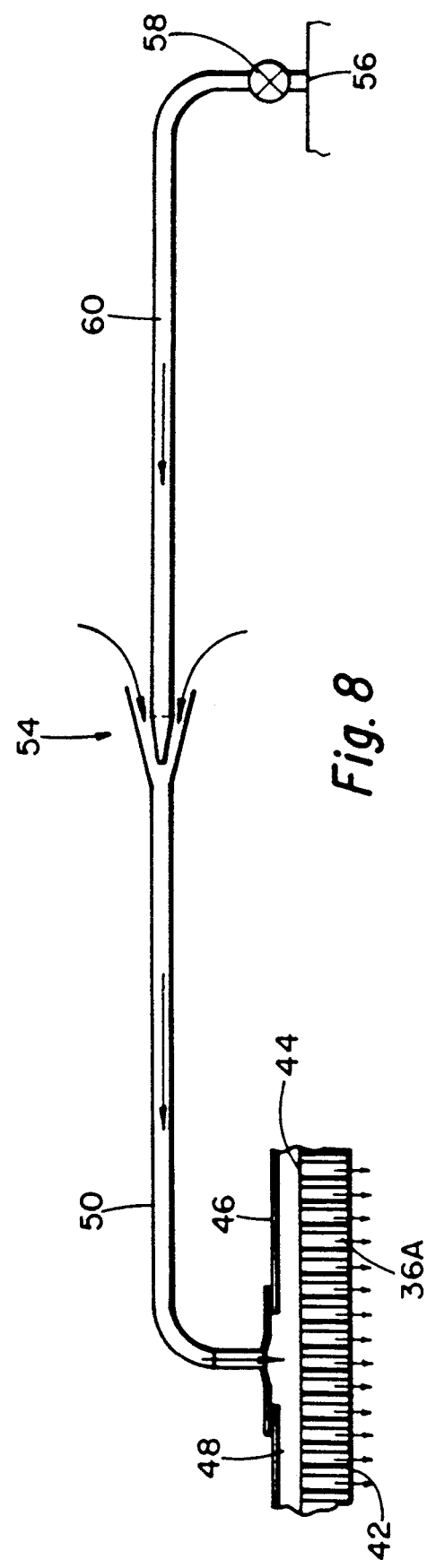

JET ENGINE NOISE REDUCTION SYSTEM

CROSS REFERENCE TO RELATED APPLICATIONS

This is a continuation-in-part of application Ser. No. 432,367, (pending) entitled "Turbofan Engine Fixed Plug Noise Suppressor" filed Oct. 6, 1989.

SUMMARY OF THE INVENTION

Noise generated by aircraft jet engines, especially during take-offs and landings, is a matter of serious concern in most metropolitan areas of the world. In the United States alone approximately 5 million people live or work adjacent airports and are affected significantly by aircraft noise. Many municipalities have taken action to require reduction in aircraft noise.

Much work has been done on designing turbofan and turbojet aircraft engines to reduce noise levels. For background information relating to noise reduction systems for jet engines reference may be had to the following U.S. Pat. Nos. 3,710,890; 4,077,206; 4,117,671; 4,501,393. These previously issued United States patents are incorporated herein by reference. One application that has achieved beneficial results in the reduction of noise of turbofan aircraft engines is the use of flow mixers of the multiple channel or multiple lobe inverted flow type. Examples of the use of such mixers for noise suppression are found in the previously referenced U.S. Pat. Nos.: 4,117,671 and 4,077,206. The use of flow mixers has been credited with noise reduction in the range of 3.5 to 4.5 dB in the Effective Perceived Noise Level (EPNL). While such noise reduction is helpful it is not sufficient within itself to solve all of the low by-pass turbofan engine noise problems and for this reason multi-lobe mixing nozzles have limited commerical application.

The benefits of a flow mixer in combination with a fixed plug and critically placed sound absorption material are described in the parent application. The present disclosure teaches the use of porous sound absorption material with means to control air flow therethrough as a means to vary the acoustical absorption properties of the sound absorption material to further reduce the noise level of a turbofan engine. The present disclosure is directed to a noise reduction system for a turbofan engine in which the engine has an aft exhaust end to which a tubular exhaust shroud is affixed. Positioned within the shroud and in the portion thereof adjacent the engine exhaust end is a flow mixer.

Supported concentrically within the exhaust shroud, in a preferred embodiment, is an elongated centerbody having an external cross-sectional area less than the internal cross-sectional area of the exhaust shroud thereby providing an annular area having substantially reduced channel flow height through which thrust producing exhaust gases of the engine pass. The walls of the shroud and plug may be parallel or may be arranged in a converging manner in the aft direction to allow the best match of aerodynamic and acoustic requirements.

Acoustical lining is affixed to at least a substantial portion of the internal circumferential area of the shroud in the area thereof receiving the centerbody. In like manner, acoustical lining is affixed to at least a substantial portion of the external surface area of the centerbody in the area thereof received within the exhaust shroud. This arrangement results in at least a substantial portion of the reduced channel height annular area through which thrust producing jet engine exhaust pass being surrounded by acoustical lining. In a preferred arrangement, the centerbody is formed of various or multiple portions having different functions, that is, a forward aerodynamically-shaped portion tailored to minimize aerodynamic losses positioned in the direction toward the engine exhaust end, an intermediate portion which, by example, can be substantially cylindrical, and an aft aerodynamically-shaped portion. Acoustical lining is secured to at least substantially all of the external surfaces of the center portion of the centerbody to absorb internal pre-emergence noise.

In a further preferred embodiment, the centerbody, in addition to being formed of the various portions above described, includes the arrangement wherein the aft aerodynamic portion is of increased cross-sectional area compared to the forward aerodynamic portion and the cylindrical portion, and such increased cross-sectional area is substantially coincident with the aft end of the exhaust shroud.

In the practice of this disclosure, at least a substantial portion of the acoustical lining affixed to the interior of the exhaust shroud is porous, and the lining has an inner surface exposed to the engine exhaust gases passing through the shroud and an outer surface. Affixed to and spaced from the outer surface of the porous acoustical lining is a wall. The wall defines a closed chamber at the acoustical lining outer surface. Piping communicates with the chamber and extends to a pressure control system providing means of varying air pressure applied to the porous acoustical lining outer surface. The pressure can be varied so as to cause air to move through the porous acoustical lining either in the direction from the outer to the inner surface or, in the reverse direction, that is, from the inner to the outer surface. By changing the direction of air flow through the acoustical lining, the acoustical absorption properties of the acoustical lining is varied.

Control of the air pressure applied to the acoustical lining chamber can be achieved by the use of an ejector pumping system utilizing, as a source of air pressure, engine bleed-air, so that the pressure in the chamber may be equal to, greater than or less than the air pressure within the exhaust shroud.

The key principles of this disclosure are:

(a) An internal mixer reduces low frequency exit nozzle jet noise and shifts the noise to higher frequency levels.

(b) A porous acoustical lining is affixed to at least a substantial portion of the internal circumferential surface of a tubular exhaust shroud affixed to a jet engine. The porous acoustical lining has an inner surface exposed to the exhaust gas passing through the shroud and an outer surface. Affixed to and spaced from the outer surface is a wall defining a chamber. Piping connects the chamber to a pressure control system utilizing a source of air pressure, such as engine bleed-air. The pressure in the chamber can be regulated to thereby cause air to flow in either direction through the acoustical lining to vary the acoustical absorption properties of the porous acoustical lining.

(c) In one embodiment, a centerbody provides a channel of reduced height through which the engine noises pass. Higher frequency sounds are more effectively absorbed by the sound absorbing material due to the reduced channel height. In addition, the shift of the sound towards higher frequencies achieved by the mixer enables the use of a centerbody of shorter length to attain a pre-selected level of sound attenuation than can otherwise be achieved and the use of porous acoustical lining permits the noise reduction system to be tuned to achieve improved attenuation of pre-emergence sound.

A better understanding of the invention will be had by reference to the following detailed description and claims, taken in conjunction with the attached drawings.

DESCRIPTION OF THE DRAWINGS

FIG. 7 is a diagrammatic view showing the use of engine bleed-air connected to an ejector pump for providing decreased pressure to the porous acoustical lining chambers to cause air to flow through the acoustical linings in the direction from the inner to the outer surfaces.

FIG. 8 is a diagrammatic view as in FIG. 7 but showing the ejector pump system arranged to apply increased pressure in chambers of the acoustical linings to cause air to flow in the direction from the rearward to the inner surfaces.

DESCRIPTION OF THE PREFERRED EMBODIMENT

Figure 1:
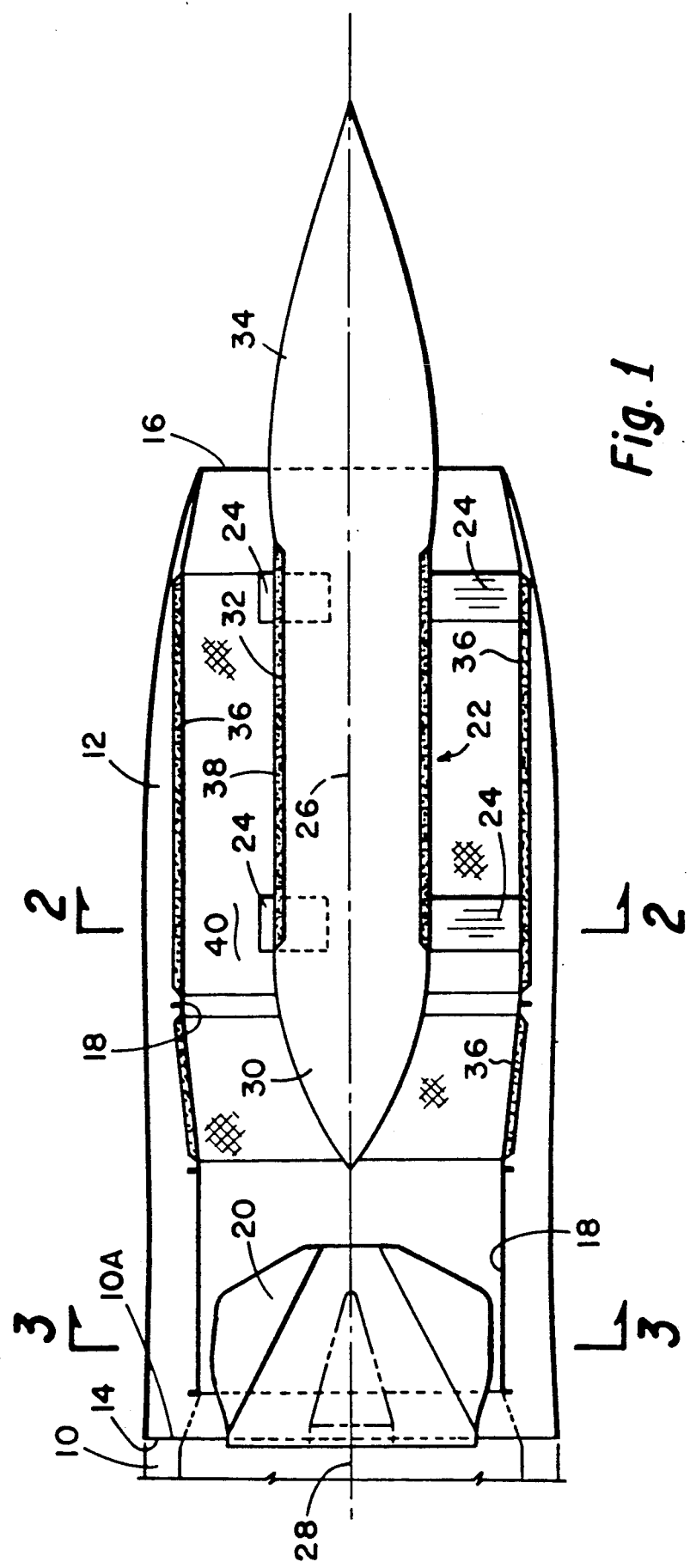
FIG. 1 is an elevational cross-sectional view of a noise reduction system for a turbofan jet engine showing an exhaust shroud affixed to the engine, a flow mixer in the forward end of the exhaust shroud, a centerbody centrally positioned in the shroud and acoustical lining secured to the exhaust shroud and centerbody.

Referring to the drawings and first to FIG. 1, some of the basic concepts of this disclosure are illustrated. The aft portion of a turbofan engine is generally indicated by the numeral 10 and the engine aft end by the numeral 10A. To reduce the noise generated by such engine there is affixed to the jet engine aft end 10A a tubular exhaust shroud 12 having a forward end 14 and an aft end 16. The exhaust shroud has an internal circumferential surface 18.

Supported within the shroud 12 and adjacent to the engine aft end 10A is a multi-lobe flow mixer 20. The essential function of the flow mixer 20 is to mix the core gas and fan·air to reduce exit jet engine noise and to increase the frequency of the pre-emergence sound generated by the engine 10. For background information as to the examples of the configuration and construction of flow mixers of the type identified by the numeral 20 reference may be had to U.S. Pat. Nos. 4,077,208 and 4,117,671.

The number of lobes employed on the flow mixer 20 can vary, and the details of construction of the flow mixer, and particularly the number of lobes, will be determined by the characteristics of the turbofan engine 10 to which the noise reduction system is designed, with the basic general purpose, as above indicated, being that of raising the frequency of the sound produced by the jet engine. The flow mixer 20 may be physically affixed to the rearward end of the turbofan engine 10 or supported by the exhaust shroud 12.

Figure 2:
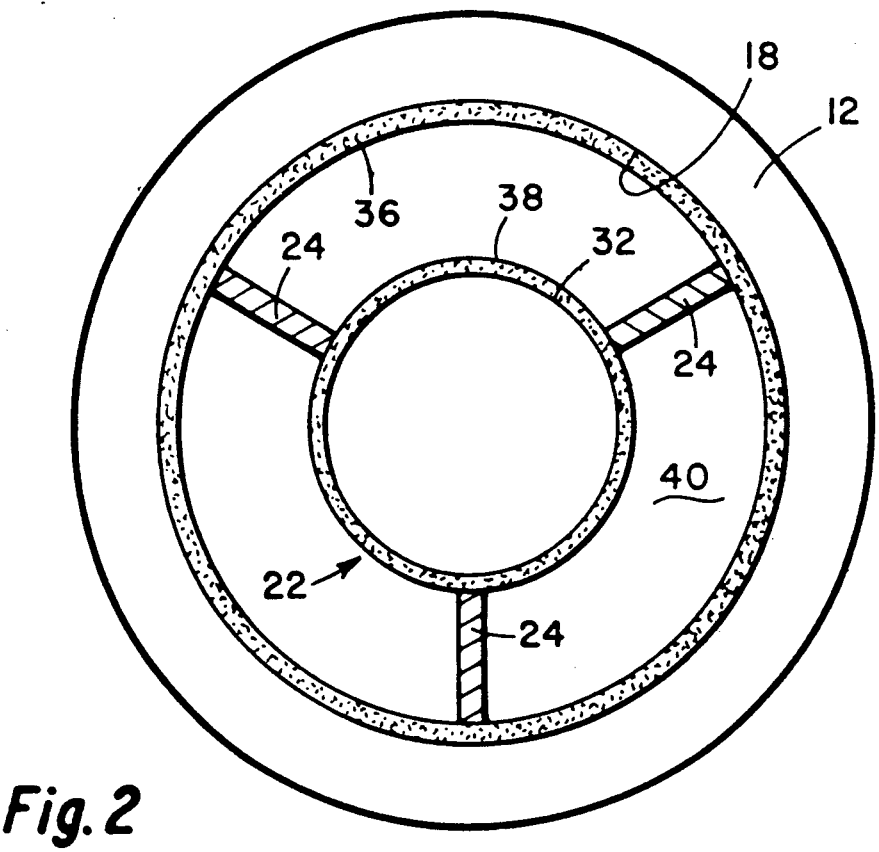
FIG. 2 is a cross-sectional view taken along the line 2—2 of FIG. 1 showing means of supporting the centerbody within the exhaust shroud.
Figure 3:
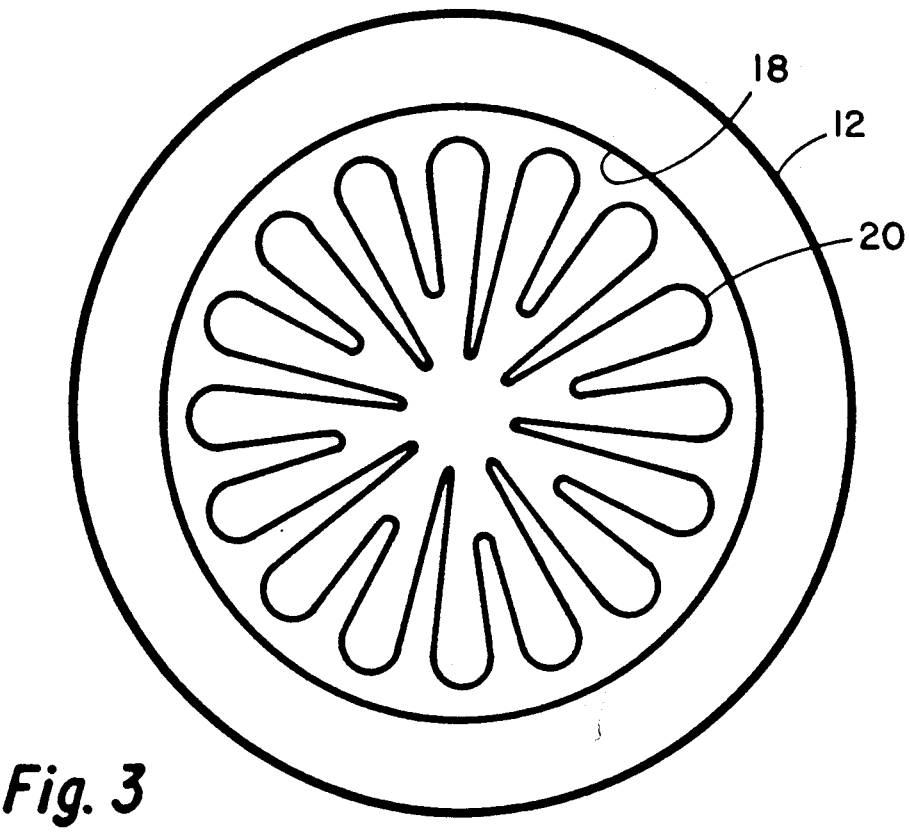
FIG. 3 is a cross-sectional view taken along the line 3—3 of FIG. 1 showing more detail of one configuration of a flow mixer as employed in one embodiment of this disclosure.

Positioned within the interior of the exhaust shroud 12 and aft of the flow mixer 20 is a centerbody generally indicated by the numeral 22. The centerbody is supported, as illustrated in FIG. 2, by struts 24. The centerbody has a longitudinal axis 26 which may or may not be coincident with the longitudinal axis 28 of the turbofan engine 10. Further, the centerbody 22 preferably is substantially symmetrical about all cross-sections taken perpendicular to the longitudinal axis 26.

The centerbody 22 may be formed of a number of basic portions. In the illustrated embodiment, the centerbody is formed of: (a) a forward aerodynamically-shaped portion 30; (b) a center, elongated cylindrical portion 32 which can also be of conical rather than cylindrical shape; and (c) an aft aerodynamically-shaped portion 34. The primary function of centerbody 22 is to provide a reduced channel height annular area.

Acoustical lining 36 is supported on at least a substantial portion of the interior circumferential surface 18 of the exhaust shroud. In addition, acoustic lining 38 is supported on at least a substantial portion of the external surface area of centerbody 22.

The acoustic linings 36 and 38 may be in the form of commercially available sound absorbent honeycomb expanded metal core joined to a perforated inner skin, however, the acoustic linings may be formed of systems using perforated screens. The thickness of the honeycomb material varies with the dominant frequency to be suppressed, typically from about 0.3 inches to 3 inches in thickness depending on the range of frequencies. If formed of such honeycomb material, the size of the contiguous hexes is preferably about ¼ to ¾ of an inch. The depth and/or height of the honeycomb material, that is, 0.3 inches to 3 inches as an example, and the cell size, that is, ¼ to ¾ inch as an example, are selected to tune the sound absorption material to the predominate noise frequencies to be attenuated. Thus, in designing a system for a particular engine, the sound frequencies having the highest Perceived Noise Level Tone-corrected (PNLT) will determine the depth of the expanded honeycomb acoustical lining, as well as and in combination with the cell size. The thickness and cell size, that is, the predominate frequency abosorbent characteristics, of the sound absorbing material may be varied from point to point within the annular area 40 to attenuate a band of sound frequencies.

The acoustic linings 36 and 38 must tolerate turbofan engine exhaust gases applications, such as typically 200° F. to 1250° F. The acoustic lining can be bonded to the shroud internal circumferential surface 18 and the external circumferential surface of the centerbody 22, such as by epoxy or, if exhaust temperatures exist which preclude use of epoxy, the acoustical lining material may be brazed, welded, or mechanically held in place with fasteners. By the use of the centerbody 22 a reduced channel height annular area 40 is provided between the exterior of the centerbody and the interior circumferential surface 18 of the exhaust shroud.

As previously indicated, a basic function of the flow mixer 20 is to increase the frequency of sound produced by turbofan engine 10 since a high frequency sound is easier to attenuate than a low frequency sound. The combination of the use of the flow mixer 20 with the centerbody 22 and with the acoustically lined reduced channel height annular area 40 provides a highly improved means of substantially reducing the EPNL of a jet engine.

In the preferred arrangement as illustrated, the cross-sectional area of the centerbody cylindrical portion 32 and the maximum cross-sectional area of the centerbody forward aerodynamically-shaped portion 30 are approximately the same, however, the maximum cross-sectional area of the centerbody aft portion 34 is greater. This increased cross-sectional area preferably occurs in the centerbody aft portion 34 substantially coincident with the exhaust shroud aft end 16, or nozzle throat, for efficiency of the overall exhaust nozzle. This means that the cross-sectional area of the annular space 40 is at a minimum at the exhaust shroud aft end 16.

Figure 4:
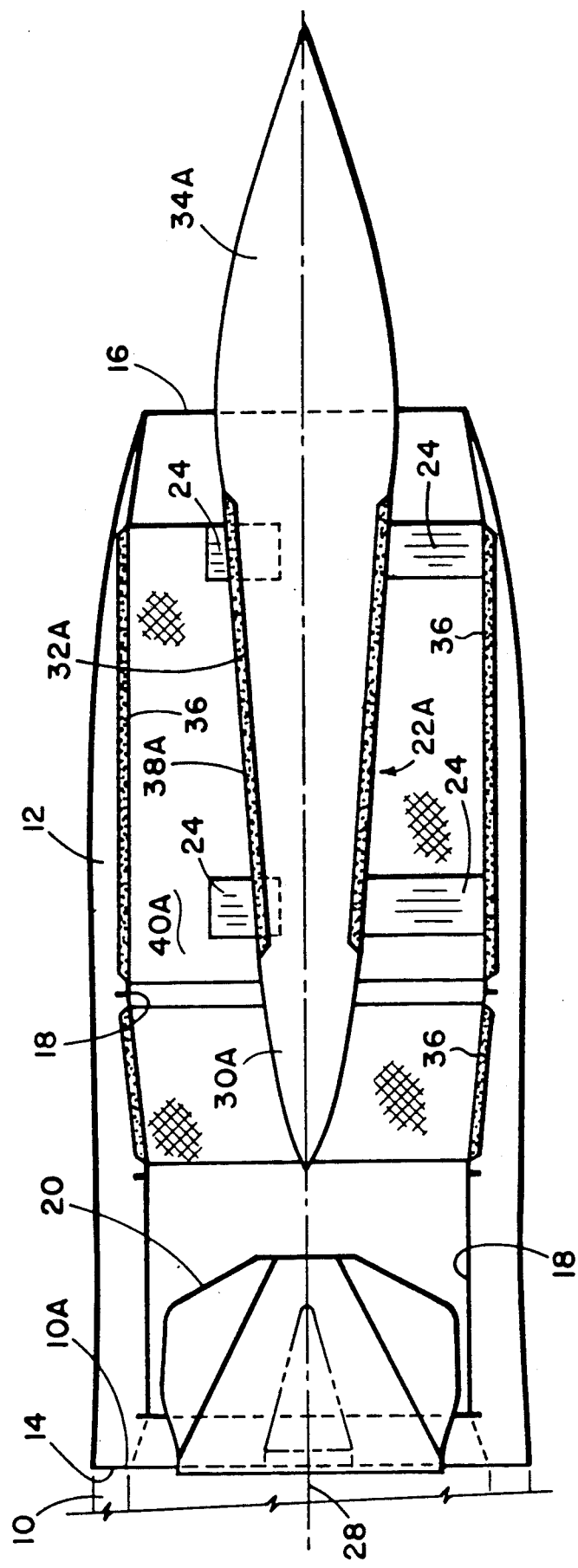
FIG. 4 is a cross-sectional view as in FIG. 3 showing an alternate configuration of the centerbody with a frustro-conical intermediate portion.

FIG. 4 shows a modified form of centerbody 22A. The centerbody is supported within the ejector shroud by means of struts 24, as previously described, with its longitudinal axis 26A preferably coindent with the engine longitudinal axis 10. Centerbody 22A has an aerodynamically-shaped forward end 30A an an aft aerodynamically-shaped portion 34A as described above with reference to elements 22, 30 and 34, and an intermediate or center portion 32A which, in contrast with cylindrical intermediate portion 32 is frustro-conical in external shape and identified by 32A. At least a substantial portion of the exterior surface of centerbody 22A is covered with acoustical lining material. In FIG. 4, substantially all of the exterior surface of the centerbody frustro-conical intermediate portion 22A is covered by acoustical lining material 38A.

The embodiment of FIG. 4 shows an arrangement in which the walls between the exterior of the centerbody and the internal wall of the shroud are not parallel but provide a tapered annular area 40A. Centerbody 22A with its conical wall converging in the forward direction allows improved match of the channel height of annular area 40A to the various frequencies of the noise of the turbofan engine 10 to be attenuated.

Figure 5:
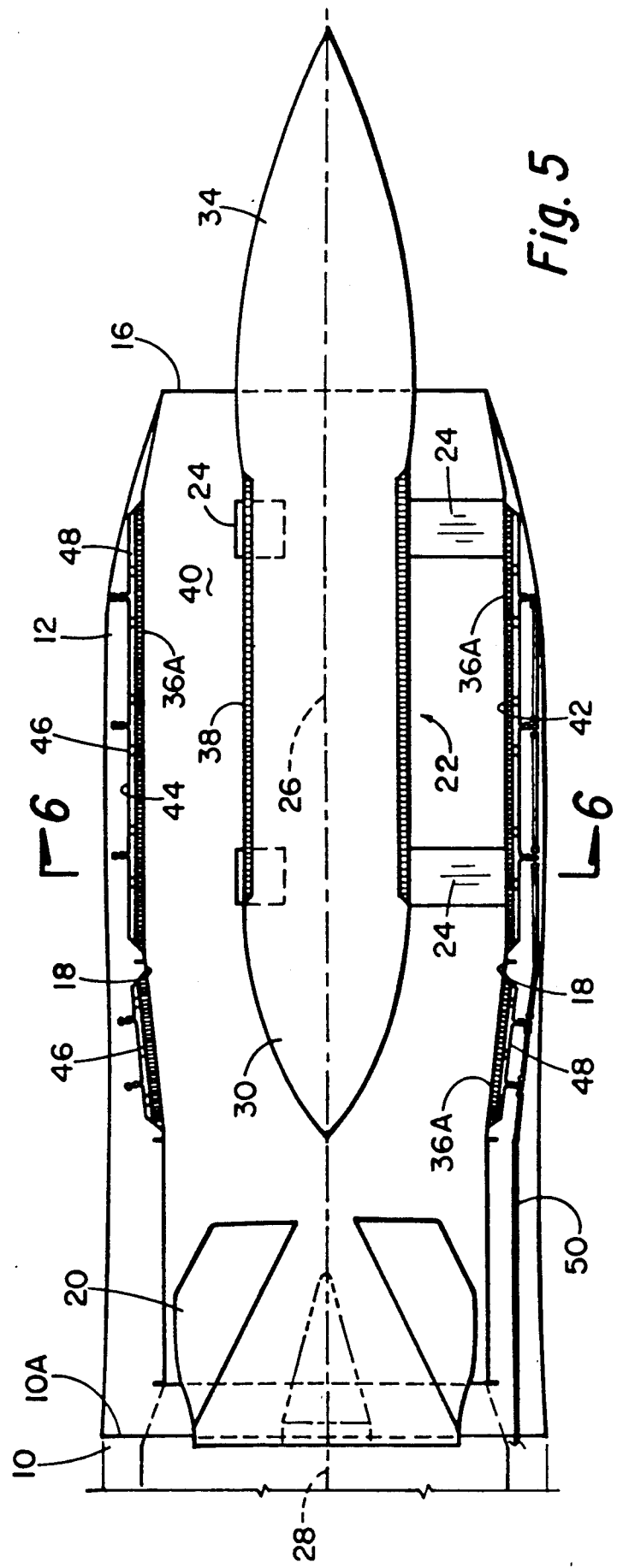
FIG. 5 is an elevational cross-sectional view of a noise reduction system similar to FIG. 1 but showing the use of porous acoustical linings within the shroud and including wall panels affixed to and spaced from the outer surfaces of the porous acoustical linings thereby defining chambers and showing piping connected to the chambers as a means of varying the air pressure in the chambers to control the passage of air through the porous acoustical linings to thereby vary the porous acoustical absorption properties of the porous acoustical lining.
Figure 6:
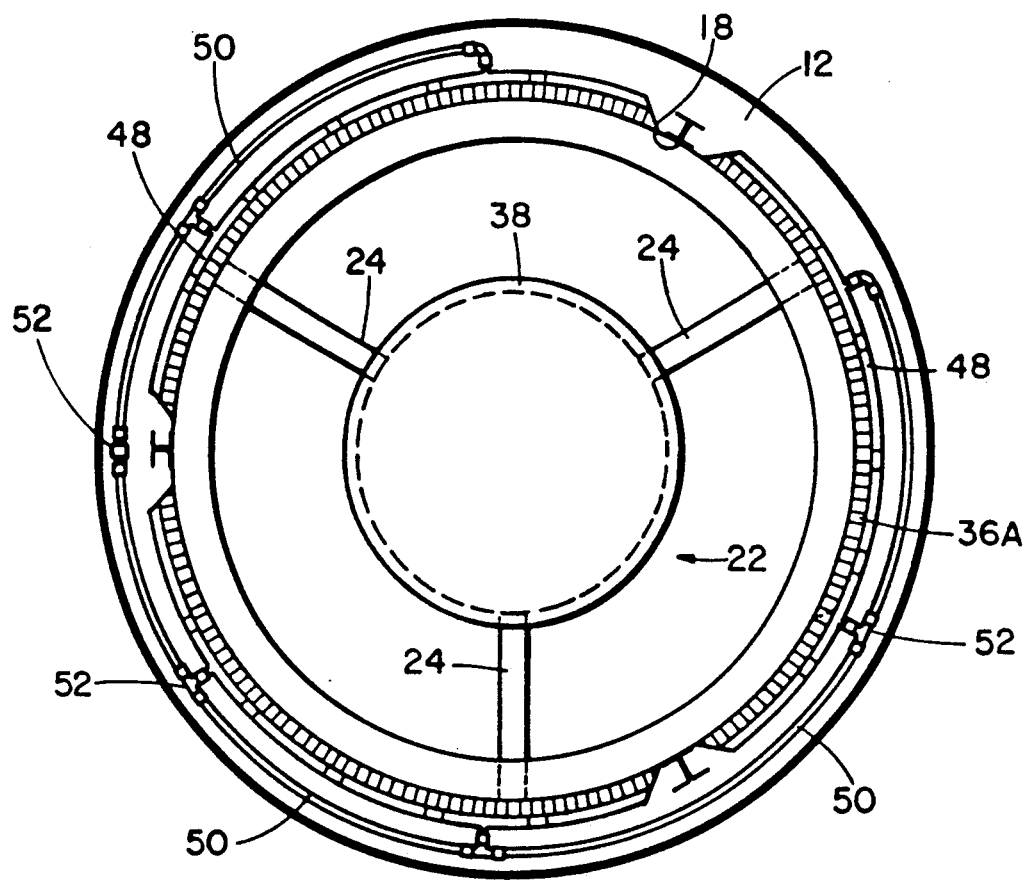
FIG. 6 is a cross-sectional view taken along the line 6—6 of FIG. 5, showing an example of how piping is used to connect the chambers at the outer surfaces of the porous acoustical linings, with conduits to thereby provide means of controlling the flow of air through the porous acoustical linings.

Referring to FIGS. 5 through 9, an improved jet engine noise reduction system is illustrated. The acoustical lining 36A, as seen in FIGS. 5 and 6, formed in at least a substantial portion of the internal circumferential surface 18 of ejector shroud 12 is porous, that is, the acoustical lining permits the flow of air therethrough. The acoustical lining 36A has an inner surface 42 which is exposed to the engine exhaust gases passing through shroud 12, and an outer surface 44. Affixed to and spaced from the outer surface 44 is a wall panel 46 which provides a chamber 48 in communication with the porous acoustical lining outer surface 44. In the embodiment illustrated in FIG. 5, the porous acoustical lining is in sections and each section is provided with a wall panel 46 to define chambers 48.

As seen in the cross-sectional view of FIG. 6, the porous acoustical lining 36A is broken into sections longitudinally to accommodate structural members. Each portion of the porous acoustical lining has an accompanying wall panel 46 providing a chamber 48. The chambers 48 are interconnected by means of piping 50, using T-fitting 52.

FIGS. 7 and 8 show diagrammatically the arrangement of piping for controlling the pressure of air in chambers 48. Piping 50 extends to an ejector pump, diagrammatically illustrated and identified by the numeral 54. Ejector pump 54 is indicative of a system for controlling air pressure in chambers 48, that is, air pressure which exists at the porous acoustical lining outer surfaces 44. Stating it another way, ejector pump 54 is representative of a system of controlling the pressure of air applied to piping 50 to cause air to flow through the porous acoustical lining 36A in the direction from the lining inner surface 42 to the outer surface 44, as illustrated in FIG. 7, or in the direction from the outer surface 44 to the inner surface 42, as indicated in FIG. 8, to thereby provide a means of controlling the acoustical absorption properties of the acoustical lining to best attenuate noise which is generated by the jet engine 10.

One means of supplying either increased or deceased air pressure to piping 50 with ejector pump 54 includes the use of a source of air pressure which may conveniently be engine bleed-air. In FIGS. 7 and 8 the engine bleed-air source is indicated by the numeral 56. This source is connected through valve 58 to piping 60 which extends to ejector pump 54. FIG. 7 shows the ejector pump 54 in the form of a venturi arrangement wherein the source of air pressure from piping 60 is utilized to derive reduced air pressure within piping 50 and to thereby cause air to flow through the porous acoustical lining 36A from the inner to the outer surface. FIG. 8, in contrast, shows the ejector pump 54 configured to provide increased air pressure within chambers 48 so that air flows through porous acoustical linings 36A in the direction from the outer to the inner surfaces.

Figure 9:
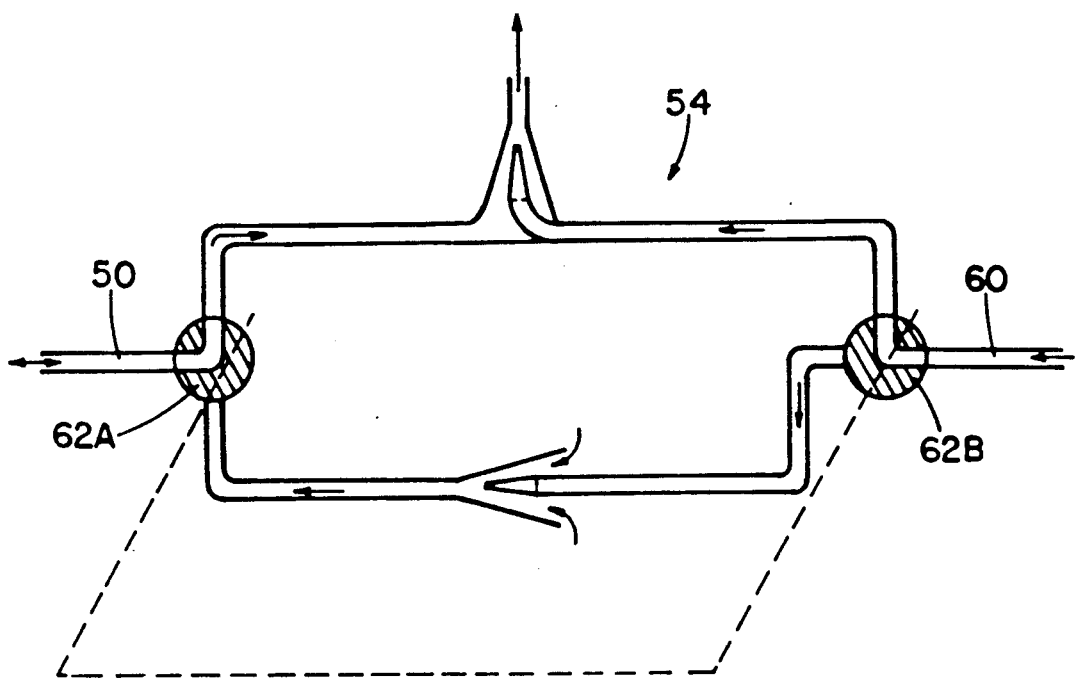
FIG. 9 is a diagrammatic view of two valves coupled for simultaneous rotation and showing the ejector pump system connected to a source of engine bleed-air. By actuation of the valves the engine bleed-air can be used to control the pressure of air applied to the acoustical lining chambers.

FIG. 9 shows diagrammatically two, two-way valves interconnected for simultaneous rotation, illustrating how a source of air pressure in piping 60, such as from engine bleed-air, can be used with the ejector pump system 54 to provide either increased or deceased air pressure in piping 50, to thereby regulate the direction of flow of air through the porous acoustical linings 36A. The valves of FIG. 9 are indicated by the numerals 62A and 62B. It must be emphasized that FIG. 9 is diagrammatic and not pictorially illustrative of an actual valving system which could be used with engine bleed-air pressure as a means of controlling the direction of air flow through the porous acoustical linings.

The diagrammatic illustrations of FIGS. 7, 8 and 9 are intended to illustrate one means of controlling the direction of flow of air through the porous acoustical linings 36A. Obviously, other means can be employed, such as a use of air compressors as a source of air.

One advantage which occurs from the use of engine bleed-air pressure, such as shown in FIGS. 7 and 8, is that engine bleed-air pressure automatically increases or decreases in response to the engine power setting. Thus, the direction as well as the rate of air flow through the porous acoustical lining can be made to vary automatically in proportion to the engine power setting by using engine bleed-air. Stating it another way, the acoustical absorption properties of acoustical linings 36A can be made to vary automatically in proportion to the engine power setting utilizing the principles set forth herein. Thus, as the intensity and frequency of sound pressure levels generated by the engine vary with the engine power setting, by the concepts of this disclosure, the sound attenuating characteristics of the porous acoustical lining can be varied consistent with such shifts in frequency and sound pressure levels.

The advantages of the noise reduction system of this disclosure are obtained without the use of moving parts (except moving valve parts or other ejector pump control means, if used) and, therefore, with the obvious advantages of reduced failure opportunities and reduced maintenance requirements.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. For use with a jet engine having an aft exhaust end, a noise reduction system comprising:
    a tubular exhaust shroud affixed to the jet engine exhaust end through which engine exhaust gases pass, the shroud having an internal circumferential surface and having a forward end and an aft end;
    porous acoustical lining supported to at least a portion of said internal circumferential surface of said shroud, the acoustical lining having an inner surface exposed to engine exhaust gases passing through said shroud and an outer surface; and
    means to control the passage of gas through at least a portion of said acoustical lining in the direction from said outer to said inner surface or in the direction from said inner to said outer surface to thereby vary the acoustical absorption properties of said acoustical lining.

2. A jet engine noise suppressor system according to claim 1 wherein said means to control the passage of gas through said porous acoustical lining further includes means to cause gas pressure to be equalized between said acoustical lining inner and outer surfaces whereby gas does not flow in either direction through at least some portion of said acoustical lining.

3. A jet engine noise reduction system according to claim 1 wherein said means to control the passage of gas through said porous acoustical lining includes means of automatically varying the passage of gas in response to the power setting of the engine to which said exhaust shroud is affixed.

4. A jet engine noise reduction system according to claim 1 in which said means to control the passage of gas through said porous acoustical lining includes ejector pump means.

5. A jet engine noise reduction system according to claim 4 wherein the jet engine to which said exhaust shroud is affixed has a bleed-air source connected to said ejector pump means, including means of controlling the application of bleed-air in said ejector pump means to control the passage of gas through said porous acoustical lining.

6. A jet engine noise reduction system according to claim 1 including:
    an elongated centerbody supported within said exhaust shroud and having an external cross-sectional area less than the internal cross-sectional area of said exhaust shroud providing an annular area of the desired channel height through which thrust producing exhaust gases of the jet engine pass.

7. A jet engine noise reduction system according to claim 6 including:
    acoustical lining affixed to at least a substantial portion of the external surface area of said centerbody in the area thereof received within said shroud, whereby at least a portion of said annular area through which thrust producing jet engine exhaust gases pass is substantially encompassed by acoustical lining.

8. A jet engine noise reduction system according to claim 1 including:
    a mixing nozzle positioned within said exhaust shroud adjacent said forward end thereof, which mixing nozzles causes engine gas mixing to increase the frequency of the internal noise source and to thereby change the frequency of the engine noise to that which is more efficiently attenuated.

9. A jet engine noise reduction system according to claim 6 wherein said centerbody is substantially circular in all cross-sections normal to the longitudinal axis thereof and is aerodynamically contoured on each end.

10. A jet engine noise reduction system according to claim 6 wherein said centerbody has at least a forward aerodynamically-shaped portion in the direction toward the jet engine exhaust end, an intermediate substantially cylindrical portion, and an aft aerodynamically-shaped portion.

11. A jet engine noise reduction system according to claim 10 wherein at least a substantial portion of the exterior surface of said centerbody intermediate substantially cylindrical portion is covered by sound absorbing material.

12. A jet engine noise reduction system according to claim 10 wherein a portion of said centerbody aft aerodynamically-shaped portion is of an external diameter greater than the external diameter of said centerbody intermediate substantially cylindrical portion.

13. A jet engine noise reduction system according to claim 12 wherein said portion of said centerbody aft aerodynamically-shaped portion having an external diameter greater than the external diameter of said centerbody intermediate substantially cylindrical portion is in a plane substantially coincident with said exhaust shroud aft end, forming an exhaust nozzle.

14. A jet engine noise reduction system according to claim 6 wherein said porous acoustical lining affixed to said exhaust shroud and said acoustical lining affixed to said centerbody varies in attenuation characteristics of different sound frequencies from one portion to another of said annular area from said shroud forward to said exhaust end whereby a selected band of sound frequencies are attenuated.

15. A jet engine noise reduction system according to claim 10 wherein said centerbody intermediate portion is of generally truncated conical external configuration converging in the direction toward said engine.

16. A jet engine noise reduction system according to claim 15 wherein said acoustical lining is affixed at least to substantially all of the exterior surface of said centerbody intermediate truncated conical portion.

17. A jet engine noise reduction system according to claim 1 including:
a chamber defining means in contact with said acoustical lining outer surface, and wherein said means to control the passage of gas through said porous acoustical lining includes means of varying the pressure in said chamber defining means.

* * * * *